(12) United States Patent
Peterlechner

(10) Patent No.: US 7,658,014 B2
(45) Date of Patent: Feb. 9, 2010

(54) LENGTH MEASURING ARRANGEMENT

(75) Inventor: Andreas Peterlechner, St. Radegund (AT)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 12/214,454

(22) Filed: Jun. 19, 2008

(65) Prior Publication Data

US 2009/0019716 A1    Jan. 22, 2009

(30) Foreign Application Priority Data

Jul. 19, 2007    (DE) .................... 10 2007 033 574

(51) Int. Cl.
*G01D 5/347* (2006.01)
*G01B 7/02* (2006.01)
*G01B 11/02* (2006.01)

(52) U.S. Cl. .......................................... 33/708; 33/706

(58) Field of Classification Search ................ 33/706, 33/707, 708; 356/615, 619
See application file for complete search history.

(56) References Cited

U.S. PATENT DOCUMENTS

| | | | |
|---|---|---|---|
| 3,833,303 A | 9/1974 | Burns et al. | |
| 3,910,703 A | 10/1975 | Burns et al. | |
| 4,295,742 A | 10/1981 | Nelle et al. | |
| 4,381,609 A * | 5/1983 | Holstein | 33/708 |
| 5,488,782 A * | 2/1996 | Ochiai | 33/708 |
| 5,729,218 A | 3/1998 | Lepperdinger | |
| 5,793,201 A * | 8/1998 | Nelle et al. | 33/706 |
| 6,571,486 B1 * | 6/2003 | Tondorf et al. | 33/706 |
| 6,867,582 B2 | 3/2005 | Muraji et al. | |
| 2002/0029488 A1 * | 3/2002 | Nishi | 33/706 |
| 2002/0153879 A1 | 10/2002 | Muraji et al. | |
| 2007/0074416 A1 * | 4/2007 | Reusing | 33/706 |
| 2009/0071025 A1 * | 3/2009 | Affa | 33/706 |

FOREIGN PATENT DOCUMENTS

| | | |
|---|---|---|
| DE | 23 49 944 A1 | 4/1974 |
| DE | 28 10 341 C2 | 1/1980 |
| DE | 29 29 488 A1 | 2/1980 |
| EP | 0 733 882 B1 | 10/1999 |
| EP | 1 211 476 A1 | 6/2002 |
| JP | 62-248368 A | 10/1987 |

* cited by examiner

*Primary Examiner*—G. Bradley Bennett
(74) *Attorney, Agent, or Firm*—Brinks Hofer Gilson & Lione

(57) ABSTRACT

A length measuring arrangement for measuring the relative position of two objects, the length measuring arrangement including a housing made of a non-magnetic material and longitudinally extending in a measuring direction. The length measuring arrangement including a scale in the housing, the scale having a measuring graduation, a first guide face and a second guide face which extends perpendicular to the first guide face. A mounting piece attachable to one of the two objects rigidly in the measuring direction and resiliently transversely to the measuring direction. The length measuring arrangement including a scanning carriage that scans the measuring graduation, wherein the scanning carriage is coupled to the mounting piece rigidly in the measuring direction and resiliently transversely to the measuring direction, and the scanning carriage is linearly guided in the measuring direction on the first and second guide faces and is pressed against the first and second guide faces. A pressure force is generated by a magnetic force between at least one first element of the scanning carriage and a second element provided on the housing.

12 Claims, 2 Drawing Sheets

LENGTH MEASURING ARRANGEMENT

RELATED APPLICATIONS

Applicant claims, under 35 U.S.C. § 119, the benefit of priority of the filing date of Jul. 19, 2007 of a German patent application, copy attached, Serial Number 10 2007 033 574.3, filed on the aforementioned date, the entire contents of which is incorporated herein by reference.

BACKGROUND

1. Technical Field

The present invention relates to a length measuring arrangement

2. Background Information

Such length measuring arrangements, such as for example described in DE 28 10 341 C2, are employed for measuring lengths as well as distances, and are in particular used in processing machinery for measuring the relative movement of a tool in relation of a workpiece to be processed, in coordinate-measuring machinery, and increasingly also in the semiconductor industry.

Here, a scale with a measuring graduation, which is protected from environmental effects, is used as the measurement representation and is placed into a housing, which extends linearly in the measuring direction. For simple and cost-effective manufacture, the housing is an extruded profile made of a non-magnetic material, in particular aluminum. In the course of position measurement, the measuring graduation, which is incrementally or absolutely coded, is scanned by a scanning carriage. For this purpose, the scanning carriage is linearly conducted along two guide faces extending perpendicularly in relation to each other and is pressed against them. This guidance has proven itself, because it is assured that a constant scanning distance between the scanning carriage, in particular the scanning plate, and the scale is maintained over the entire measurement length, which guarantees the good quality of the scanning signal. The guidance of the scanning carriage is decoupled from the guidance of the object to be measured in that a mounting piece with a coupling is provided between the object to be measured and the scanning carriage, which coupling couples the scanning carriage rigidly to the mounting piece in the measuring direction and resiliently transversely to it. Pressing the scanning carriage against the two guide faces of the scale, which extend perpendicularly in relation to each other, i.e. the generation of the pressing force, takes place in the prior art by a spring arm (DE 23 49 944 A1), or by several pressure springs, wherein each of the guide feces is provided its own spring (DE 28 10 341 C2), whose pressure force is oriented toward the respective guide face. As a rule, these springs, which are oriented perpendicularly to each other, are arranged between the scanning carriage and the mounting piece, this leads to the distance between the scanning carriage and the mounting piece having an influence on the pressure forces. It is therefore necessary to select the installation tolerances to be particularly small.

The demands made on length measuring arrangements are continuously increasing, higher resolution, as well as greater accuracy and reproducibility of the position measurement is continuously being demanded. Along with this, a compact mechanical structure should be provided, and the length measuring arrangement should be produced in a cost-effective manner.

OBJECTS AND SUMMARY OF THE INVENTION

The present invention is based in part on the object of creating a length measuring arrangement having high measuring accuracy, which can be produced in a cost-effective manner.

In accordance with the present invention, this object is attained by a length measuring arrangement for measuring the relative position of two objects, the length measuring arrangement including a housing made of a non-magnetic material and longitudinally extending in a measuring direction. The length measuring arrangement including a scale in the housing, the scale having a measuring graduation, a first guide face and a second guide face which extends perpendicular to the first guide face. A mounting piece attachable to one of the two objects rigidly in the measuring direction. The length measuring arrangement including a scanning carriage that scans the measuring graduation, wherein the scanning carriage is coupled to the mounting piece rigidly in the measuring direction and resiliently transversely to the measuring direction, and the scanning carriage is linearly guided in the measuring direction on the first and second guide faces and is pressed against the first and second guide faces. A pressure force is generated by a magnetic force between at least one first element of the scanning carriage and a second element provided on the housing.

These requirements demand an encapsulated length measuring arrangement with a protectively housed scale. High resolution requires a continuously shorter scanning distance, which is constant over the entire measurement distance. This is achieved by guiding the scanning carriage on the scale, wherein, for undisturbed precise guidance, the scanning carriage is coupled to the mounting piece by a coupling which is rigid only in one direction. In all other directions this coupling makes possible a movement of the mounting piece without causing a reaction to the precise guidance and movement of the scanning carriage in the measuring direction. For a precise straight-ahead guidance, the scanning carriage is guided on two guide faces of the scale, which extend perpendicularly to each other, and is pressed against them, wherein the pressing force is provided by the magnetic force between at least one first element of the scanning carriage and a second element provided on the non-magnetic housing.

A compact construction of a length measuring arrangement is made possible by the present invention, and a high degree of measuring accuracy and a reproducible position measurement can also be achieved.

With the length measuring arrangement embodied in accordance with the present invention, the pressure force with which the scanning carriage is urged against the scale is independent from its installation. The distance between the scanning carriage and the mounting piece does not affect the pressing force.

The guidance of the scanning carriage on the scale guarantees an exact parallel guidance with respect to the measuring graduation, because the surface of the scale is precisely aligned with the course of the measuring graduation.

Further details and advantages of the present invention will be explained by the following description of exemplary embodiments of the position measuring arrangement in accordance with the present invention in connection with the drawing figures.

Shown here are in:

DETAILED DESCRIPTION OF THE PREFERRED EMBODIMENTS

Figure 1:
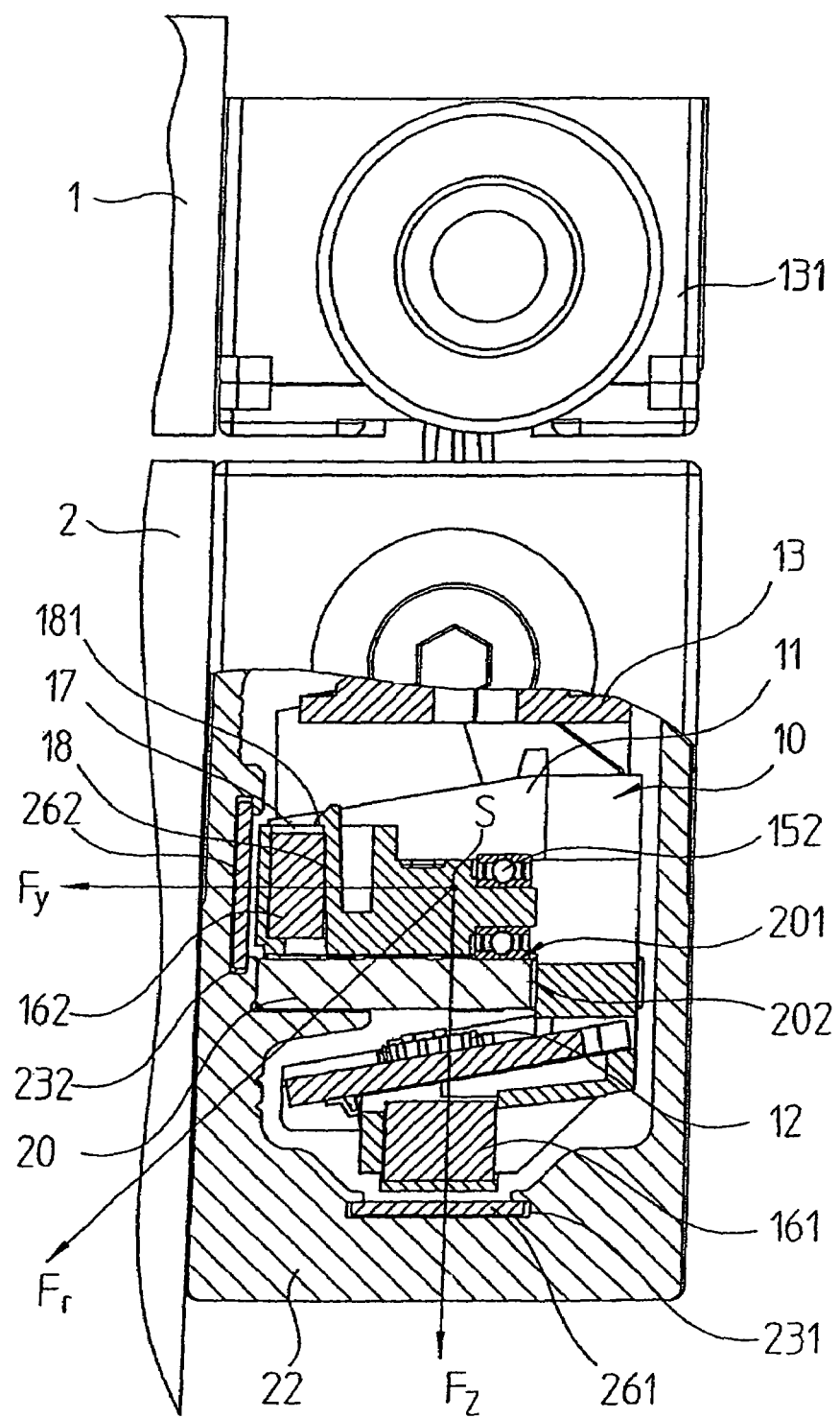
FIG. 1 shows a partial sectional view of an embodiment of a length measuring arrangement transversely to the measuring direction in accordance with the present invention.
Figure 2:
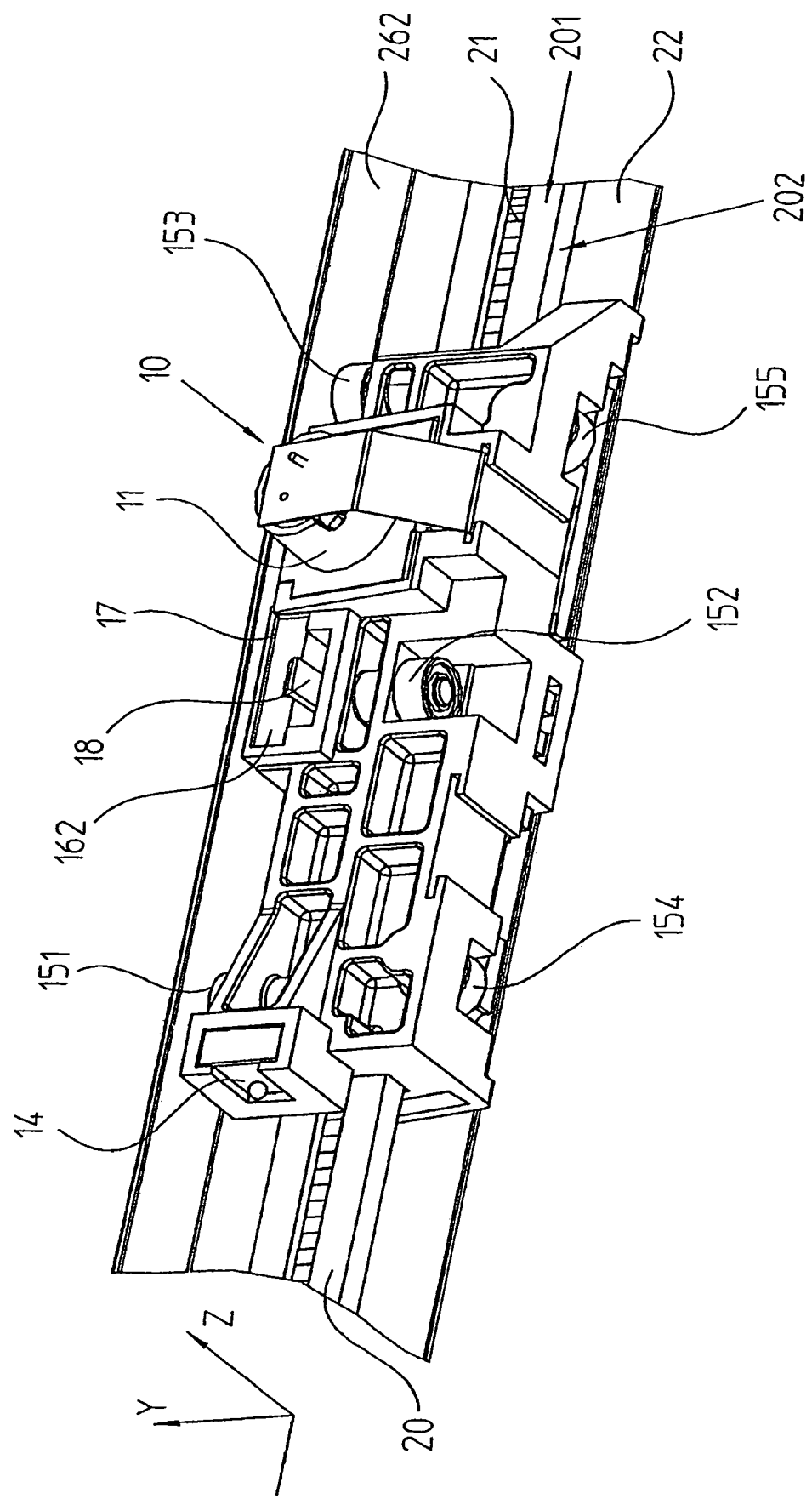
FIG. 2 shows a perspective plan view of an embodiment of a scanning carriage with a portion of an embodiment of the housing of the length measuring arrangement in FIG. 1 in accordance with the present invention.

The present invention will be presented by an example of an optical length measuring arrangement, with which it is intended to measure the relative position of two objects 1 and 2, which can be displaced relative to each other in the measuring direction X. In the course of this a transparent scale 20, in particular made of glass, is scanned by a scanning carriage 10, which can be moved relative to the scale 20 in the measuring direction X. The scale 20 has a measuring graduation 21, which is scanned in incident light by the scanning carriage. For this purpose, the scanning carriage 10 has an illumination unit 11, which emits a beam of light, which passes through the scale 20 and at the end impinges on light-sensitive scanning sensors 12 on the scanning carriage 10. In the process, the beam of light is modulated as a function of the position of the measuring graduation 21 on the scale 20.

The scale 20 is arranged inside a housing 22, which in turn is fastened on the object 2 to be measured, for example the machine bed of a machine tool. In this case the scale 20 is connected in a known manner with the housing 22, for example by gluing or clamping. The housing 22 has a slit extending in its longitudinal direction in the measuring direction X which is closed by seeing lips which are inclined in a roof-shape and through which a mounting piece 13 extends with a sword-shaped center piece. The mounting piece 13 has a mounting area 131, by which it can be attached to the object 1, for example a carriage of the machine tool, which can be displaced relative to the machine bed 2.

A coupling 14 is arranged between the scanning carriage 10 and the mounting piece 13, which couples the scanning carriage 10, rigidly in the measuring direction X and resiliently transversely to it, to the mounting piece 13. Because of this measure, erroneous alignments of the mounting piece 13 are not transmitted to the scanning carriage 10. The coupling 14 is only schematically represented. In a manner known per se, it is for example designed as a ball coupling in accordance with EP 0 733 882 B1, in which a ball made of a ferromagnetic material is clamped and maintained by a magnetic force between a face of the mounting piece 13 extending perpendicularly in relation to the measuring direction and a face of the scanning carriage 10 extending perpendicularly in relation to the measuring direction.

The scanning carriage 10 is guided along the scale 20 for exact parallel guidance on it. To this end, the scanning carriage 10 is supported via guide elements 151 to 155 on two faces 201, 202 of the scale 20, which are aligned perpendicularly to each other. One of these faces is the surface 201 supporting the measuring graduation 21, and the other a narrow side 202 of the scale 20 extending perpendicularly to it. The guide elements can be sliding elements, but in particular rollers or rolls 151 to 155, seated on ball bearings.

The scanning carriage 10 is urged against the faces 201, 202 of the scale 20 by the cooperation between magnetic elements 161 and 261, as well as 162 and 262. This pressing force is provided by a magnetic force between at least one first element 161, 162 of the scanning carriage 10 and at least one second element 261, 262 provided on the housing 22. The term magnetic material defines a material which is ferromagnetic or is permanently magnetic. The first element in particular is a permanent magnet 161, 162, and the second element 261, 262 is an element made of ferromagnetic material and attached to the housing 22. The permanent magnets are in particular made of NdFeB.

The housing 22 is made of a non-magnetic material, it is an extruded profile made of aluminum in particular. This has the advantage that it is possible to form various functional elements on the profile 22 without additional efforts, for example supports or receptacles for the scale 20, as well as receivers for the sealing lips for attachment to the object 2. This possibility is utilized by the present invention in that grooves 231, 232 are formed in the housing 22 for drawing in tapes 261, 262. The tapes 261, 262 are made of ferromagnetic steel.

The scanning carriage 10 is supported on the face 201 by guide elements, in particular several rollers 151, 152, 153 seated in ball bearings. The pressure force Fz of the scanning carriage 10 on the face 201 is oriented perpendicularly to this face 201 and is generated by the mutual action of the magnet 161 fixed in the scanning carriage 10 and the steel tape 261 pushed into the groove 231. The steel tape 261 extends parallel with the face 201 in the measuring direction X and is placed opposite the magnet 161, namely at a distance of approximately 0.8 mm. The pressure force Fz is approximately 2.3 N.

Perpendicularly to this, the scanning carriage 10 is supported on the face 202 by the guide elements, in particular by several rollers 154 and 155 seated in ball bearings. The pressure force Fy of the scanning carriage 10 on this face 202 is oriented perpendicularly to this face 202 and is generated by the mutual action of the magnet 162 fixed in the scanning carriage 10 and the steel tape 262 pushed into the groove 232. The steel tape 262 extends parallel with the face 202 in the measuring direction X and is placed opposite the magnet 162, namely at a distance of approximately 0.8 mm. The pressure force Fy is approximately 1.8 N.

The two rollers 154 and 155 are arranged symmetrically with respect to the magnet 162, and the two rollers 151 and 153 are arranged symmetrically with respect to the magnet 161, wherein the roller 152 is arranged in the X-position of the magnet 151, which corresponds to the sectional position represented in FIG. 1. The spatial arrangement of the rollers 151 to 155, and the pressure forces Fy and Fz generated by the magnetic force, are laid out in such a way that the forces acting on the individual rollers 151 to 155 are approximately equal, in the example approximately 0.8 N. The pressure forces Fy, Fz generated by the magnetic force are oriented and dimensioned in such a way that the force Fr resulting therefrom extends at least approximately through the center of gravity S of the scanning carriage 10.

The size and strength of the magnets 161, 162, as well as the distance from the corresponding steel tape 261, 262 has been selected to be such, that the magnetic force changes as little as possible, even in case of a change of the distance. Thus, the distance is placed into as flat as possible a range of the magnetic force-distance characteristic.

Holding the magnets 161, 162 takes advantageously place in a pocket-shaped receptacle 17 of the scanning carriage 10. As represented in the sectional representation in FIG. 1 by the example of the magnet 162, the receptacle is embodied in such a way that the magnet 162 can be pushed into the receptacle 17 and the magnet 162 snaps into it. In the inserted state the magnet 162 is held by a protrusion 181 of a resilient tongue 18. Thus, the magnet 162 is snapped into the receptacle. 17.

In the extensively explained example, the first element of the scanning carriage 10 is at least one permanent magnet 161, 162, namely the permanent magnet 161 for the pressing force Fx, and the permanent magnet 162 for the pressing force Fy. The second element includes two steel tapes 261 and 262 drawn into the grooves 231, 232. Alternatively to this the steel tapes 261, 262 can also be glued to the insides of the housing 22. A further variation would be to replace the steel tapes by magnetic tapes, i.e. tape-shaped permanent magnets, which are drawn into grooves of the housing or are glued to the housing and, together with permanent magnets, or ferromagnetic elements, of the scanning carriage generate the required magnetic force.

The present invention is not restricted to an optical scanning principle. Scanning of the scale can also be capacitive, magnetic or inductive, for which the measuring graduation and the scanning sensors must be appropriately embodied.

The foregoing description is provided to illustrate the invention, and is not to be construed as a limitation. Numerous additions, substitutions and other changes can be made to the invention without departing from its scope as set forth in the appended claims.

I claim:

1. A length measuring arrangement for measuring the relative position of two objects, comprising:
   a housing made of a non-magnetic material and longitudinally extending in a measuring direction;
   a scale in said housing, said scale comprising:
      a measuring graduation;
      a first guide face;
      a second guide face which extends perpendicular to said first guide face;
   a mounting piece attachable to one of said two objects rigidly in said measuring direction
   a scanning carriage that scans said measuring graduation, wherein said scanning carriage is coupled to said mounting piece rigidly in said measuring direction and resiliently transversely to said measuring direction, and said scanning carriage is linearly guided in said measuring direction on said first and second guide faces and is pressed against said first and second guide faces,
   wherein a pressure force is generated by a magnetic force between at least one first element of said scanning carriage and a second element provided on said housing.

2. The length measuring arrangement in accordance with claim 1, wherein said second element comprises a tape made of a magnetic material.

3. The length measuring arrangement in accordance with claim 2, wherein a groove is cut into said housing into which said tape is pushed.

4. The length measuring arrangement in accordance with claim 3, wherein said housing is an extruded profile made of aluminum, in which said groove is formed.

5. The length measuring arrangement in accordance with claim 2, wherein said tape extends parallel to said first guide face.

6. The length measuring arrangement in accordance with claim 2, wherein said tape is a steel tape.

7. The length measuring arrangement in accordance with claim 1, wherein said scanning carriage is guided by a plurality of guide elements on each one of said first and second guide faces of said scale.

8. The length measuring arrangement in accordance with claim 7, wherein said magnetic force is such that each of said plurality of guide elements is loaded to said pressure force in an approximate equal manner.

9. The length measuring arrangement in accordance with claim 1, wherein said at least one first element is a permanent magnet.

10. The length measuring arrangement in accordance with claim 9, further comprising a receptacle provided in said scanning carriage, wherein said at least one first element is inserted in and snapped into place in said receptacle.

11. The length measuring arrangement in accordance with claim 10, wherein said receptacle comprises a resilient tongue with a protrusion for snapping-in said at least one first element.

12. The length measuring arrangement in accordance with claim 1, wherein said pressure force comprises a first component and a second component, said first component is perpendicular on said first guide face and said first component is generated by a second magnetic force between a first steel tape and a first permanent magnet, wherein said first steel tape is pushed into a first groove of said housing so that said first steel tape is located opposite to said first permanent magnet of said scanning unit; and
   wherein said second component is perpendicular oh said second guide face, and said second component is generated by a third magnetic force between a second steel tape and a second permanent magnet, wherein said second steel tape is pushed into a second groove of said housing so that said second steel tape is located opposite to said second permanent magnet of said scanning unit, wherein said second magnetic force and said third magnetic forces are components of said magnetic force.

* * * * *

UNITED STATES PATENT AND TRADEMARK OFFICE
CERTIFICATE OF CORRECTION

| | | |
|---|---|---|
| PATENT NO. | : 7,658,014 B2 | Page 1 of 1 |
| APPLICATION NO. | : 12/214454 | |
| DATED | : February 9, 2010 | |
| INVENTOR(S) | : Andreas Peterlechner | |

It is certified that error appears in the above-identified patent and that said Letters Patent is hereby corrected as shown below:

On the Title Page

Item (30) line 1, under "Foreign Application Priority Data", replace "10 2007 033 574" with --10 2007 033 574.3--.

In column 6, claim 12, line 40, after "is perpendicular" replace "oh" with --on--.

Signed and Sealed this

Seventh Day of December, 2010

David J. Kappos
*Director of the United States Patent and Trademark Office*